(12) United States Patent
Sallberg et al.

(10) Patent No.: US 6,353,620 B1
(45) Date of Patent: Mar. 5, 2002

(54) SYSTEM AND METHOD FOR FACILITATING INTER-NODAL PROTOCOL AGREEMENT IN A TELECOMMUNICATIONS

(75) Inventors: Krister Sallberg, Lund (SE); Martin Reichelt, Plano, TX (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/058,044

(22) Filed: Apr. 9, 1998

(51) Int. Cl.[7] .................................................. H04J 3/22
(52) U.S. Cl. ........................ 370/465; 370/410; 379/229; 709/230
(58) Field of Search ................................. 370/465, 466, 370/467, 401, 410, 412; 709/230; 379/229

(56) References Cited

U.S. PATENT DOCUMENTS

| | | | |
|---|---|---|---|
| 4,998,248 A | * 3/1991 | Matsuzaki | 370/465 |
| 5,142,528 A | 8/1992 | Kobayashi et al. | 370/79 |
| 5,408,419 A | 4/1995 | Wong | 364/514 |
| 5,491,693 A | * 2/1996 | Britton et al. | 370/466 |
| 5,516,513 A | * 5/1996 | Metzger et al. | 395/200.15 |
| 5,629,974 A | 5/1997 | Rajala et al. | 379/58 |
| 6,147,992 A | * 11/2000 | Giroir et al. | 370/300 |

FOREIGN PATENT DOCUMENTS

| | | | |
|---|---|---|---|
| EP | 0 279 232 A2 | 8/1988 | |
| WO | WO 98/35526 | 8/1998 | |
| WO | 99/07605 | 11/1999 | |

OTHER PUBLICATIONS

Draft prETS 300 974 (GSM 09.02 version 5.5.1), May 1997.
Draft prETS 300 599 (GSM 09.02 version 4.12.0) Dec. 1995.

* cited by examiner

Primary Examiner—Ricky Ngo
(74) Attorney, Agent, or Firm—Jenkens & Gilchrist P.C.

(57) ABSTRACT

A system and method in a communications network for minimizing the number of attempts required to establish a communication between two nodes is disclosed. Each node maintains a database table composed of addresses of other nodes within the communications system. Associated with each nodal entry is a list of dialogue types that have been initiated with or terminated from the relevant node. Associated with each dialogue type entry is the most-advanced protocol version, such as the Mobile Application Part (MAP), that has been negotiated with the affiliated node for that dialogue type. When a first node wishes to initiate a dialogue with a second node, the first node checks the database table. The first node locates the second node in the table by address, locates the appropriate dialogue by type, and then determines the appropriate MAP version. If either the node or the specifically desired dialogue type is not within the database table, the first node attempts to establish the dialogue with the highest MAP version that the first node supports. After any resulting fall-back procedure has occurred, the first node stores in the database table the highest MAP version that was negotiated. The database table is periodically refreshed by clearing one or more entries.

36 Claims, 6 Drawing Sheets

280

| MAP Version Prediction Table ||
| Node | Dialogue Type |
| Address of Node 1 | MAP Version used for Dialogue Type 1 — 320 |
| | MAP Version used for Dialogue Type 2 — 325 |
| | ... |
| | MAP Version used for Dialogue Type k — 330 |
| Address of Node 2 | MAP Version used for Dialogue Type 1 |
| | MAP Version used for Dialogue Type 2 |
| | ... |
| | MAP Version used for Dialogue Type k |
| ... | MAP Version used for Dialogue Type 1  [Storage Time] — 355 |
| | MAP Version used for Dialogue Type 2 |
| | ... |
| | MAP Version used for Dialogue Type k |
| Address of Node n | MAP Version used for Dialogue Type 1 — 340 |
| | MAP Version used for Dialogue Type 2 |
| | ... |
| | MAP Version used for Dialogue Type k — 345 |

SYSTEM AND METHOD FOR FACILITATING INTER-NODAL PROTOCOL AGREEMENT IN A TELECOMMUNICATIONS

BACKGROUND OF THE INVENTION

1. Technical Field of the Invention

The present invention relates in general to communication establishment in communication networks and, in particular, to a system and method for minimizing the number of messages transmitted to establish a communication in telecommunications networks.

2. Description of Related Art

Mobile wireless communication is becoming increasingly important for safety, convenience, and simply enjoyment. One prominent mobile communication option is cellular communication. Cellular phones, for instance, can be found in cars, briefcases, purses, and even pockets. To maximize the enjoyment of cellular phones, however, cellular systems must be optimized.

Cellular systems are composed of not only wireless, but also wireline, communication channels. Wireline communication channels include connections both within the cellular network and those that extend beyond the cellular network to connect to the public switched telephone network (PSTN). Due to the prominence of the wireline portions of the cellular network, optimizing cellular systems requires efficient utilization of the wireline connections. One measure of efficiency is cost minimization, so a system and method that reduces the cost of cellular service improves efficiency.

It should be understood that the various nodes in wireline networks are interlinked. The links enable networks as a whole and the individual nodes to communicate with one another. Nodes can be, in a Global System for Mobile Communications (GSM) network for example, well-known components according to the GSM standard such as a Gateway Mobile Switching Center (GMSC), a Home Location Register (HLR), or a Mobile Switching Center/Visitor Location Register (MSC/VLR). Communication between nodes within the telecommunications system is preferably accomplished through Signaling System No. 7 (SS7) protocols, as is understood to those skilled in the art. One application protocol for use in mobile SS7 networks is the Mobile Application Part (MAP). MAP is responsible for providing mobility services such as Location Management Services and Subscriber Management Services.

The MAP protocol standard, like most standards, has evolved since its inception. Unfortunately, not all nodes employing SS7 technology are immediately updated with the latest MAP protocols. It is generally thought that the most advanced protocol in common between two communicating nodes should be used in an inter-nodal communication since this provides the greatest functionality and communication features. To that end, a first node may attempt to communicate with a second node with a more recent, e.g., a higher numbered, version than the second node can understand, an example of which is shown in FIG. 1.

With reference now to FIG. 1, a sequence diagram, generally designated by the reference numeral 100, is illustrated. The sequence diagram 100 represents a negotiation between two GSM network nodes utilizing MAP protocol. A negotiation typically begins a communication between the two nodes and is designed to establish the highest, mutually-understood MAP version level. Each communication corresponds to a dialogue type, otherwise known as an Application Context (AC) when using MAP.

In FIG. 1, for example, a sender 110 is a node that has been updated to a third protocol version and is trying to communicate with a receiver 120, which only understands a second, older protocol version. In conventional systems, the sender 110 attempts to start the communication with a message 130 using the aforementioned third protocol version of the communication program (Protocol #3). The receiver 120, however, understanding only the second protocol version of MAP (Protocol #2) and no higher, responds with a message 140 instructing the sender 110 to stop the communication because the message 130 was not understood.

With respect to the message 140 that is transmitted from the receiver 120 to the sender 110, the contents of the message 140 explicitly inform the sender 110 that the desired communication is only supported in the second protocol version. Hence, the sender 110 then falls-back to the second protocol version and reattempts to start the desired communication using the second protocol version in a message 150, i.e., Protocol #2 in this example. The receiver 120, configured for this second protocol version, understands the attempt and responds accordingly with a message 160 permitting the desired communication to continue with the second protocol version.

Alternatively, the receiver 120 may only understand the first protocol version of MAP (Protocol #1). In this instance, the message 140 implicitly informs the sender 110 that only the first protocol version is supported. The message 140 essentially responds by relaying that it does not understand 130 at all. The sender 110 can then determine implicitly that only the first protocol version is supported. Thus, the sender 110 then falls-back to the first protocol version, i.e., the oldest or most basic version, and reattempts to start the desired communication using the first protocol version (Protocol #1) in the message 150. The receiver 120 then responds with the message 160 permitting the desired communication to continue with the first protocol version.

Although messages in the MAP protocol provide either an explicit or an implicit indication of the highest protocol version that is understood by the receiving node, this is not true for all protocols. With other protocols, the fall-back procedure may be sequential, e.g., from the third to the second to the first version, because no indication of the highest understood protocol version is provided by the receiving node. Hence, a falling-back procedure can require from one exchange, e.g., with MAP as described above, to a multiple of exchanges, e.g., where the protocol version level is sequentially reduced until compatibility is attained.

These falling-back procedures, although simple to implement, are unfortunately an uneconomical usage of network resources. Each message transaction 130–160 transmitted over the network consumes network bandwidth and therefore costs the cellular provider, which costs are naturally passed on to the cellular user. As is understood in the art, each communication over the network is charged by the network provider at a certain price per octet (byte) of data transmitted. Hence, reducing the number of data exchanges and time required to establish an internodal communication saves money. A system and method that can so reduce the number of typical fall-backs is, accordingly, desired.

It should further be understood that the situation illustrated in FIG. 1 is exacerbated as more updates of the MAP or other protocol become extant and the updates are issued more frequently. Furthermore, not only do different versions, i.e., major revisions of the standard, exist, but many incompatible variations, e.g., smaller changes to or enhancements of a major standard within a given Public Land Mobile Network (PLMN)) also permeate cellular networks. A variation (which may be realized by a protocol extension of a particular MAP version dialogue type) on one of the versions is typically implemented within one vendor's network, which is usually updated all at once; nevertheless, multiple variations can cause incompatibilities. It would, therefore, be advantageous to utilize a system and method that can reduce the number of typical fall-backs by predicting the version (and even the variation) of MAP protocols capable of being used by a given node or entire PLMN for a given dialogue type.

The present invention addresses these (and other) deficiencies in conventional systems and methods by achieving the following (and other) objects of the invention:

A first object of the present invention is to reduce the number of communications required to negotiate between two nodes at a mutually-understood protocol level.

Another object of the present invention is to reduce the number of communications required to negotiate a mutually-understood protocol level between a first node and a second node by predicting at the first node the highest protocol level understood by the second node.

A further object of the present invention is to predict at the first node the highest protocol level understood by the second node by storing in a database table at the first node the most recently negotiated protocol level between the first node and the second node.

Yet another object of the present invention is to implement a protocol-predicting table that stores the protocol level understood for each dialogue type that has been negotiated with a given node.

Yet another object of the present invention is to implement a protocol-predicting table that stores the protocol level at both the nodal and the PLMN level.

A still further object of the present invention is to implement an elegantly simple system and method for reducing the number of communications required to negotiate a mutually-understood protocol level between two nodes that requires that only one table be stored in memory and accessed for each communication.

Another object of the present invention is to implement a simple system and method that requires no human operator intervention or interaction to function.

An additional object of the present invention is to implement a simple system and method that can be used permanently without regard to scheduled periods for protocol updating.

SUMMARY OF THE INVENTION

These and other objects of the present invention are achieved with a system and method for use in communications networks that enables a first node to initiate a communication with a second node using the most-advanced protocol version that the second node recognizes and understands. In an exemplary conventional system, dialogues across Public Land Mobile Network (PLMN) boundaries start with the highest Mobile Application Part (MAP) version available for the operation at the dialogue-initiating node. The fall-back procedure is then used to step down to the highest MAP version both nodes have in common. The present invention reduces or eliminates such fall-back procedures and therefore the number of costly messages required to communicate with distant nodes.

In accordance with the present invention, a database is maintained at each node in communications networks. The database is preferably composed of a single, persistent, and autonomously-maintained table. The table enables a first node to store, and subsequently retrieve for use, the latest protocol version that a second node is capable of understanding. Hence, once a communication has been established and the appropriate protocol version determined between the first and second nodes, the first node can use the determined protocol version to initiate subsequent communications. This eliminates the wasting of network signaling bandwidth that can otherwise occur.

In a preferred embodiment of the present invention, the communications networks are cellular networks and the signaling protocol is MAP. In this embodiment, the database table is further divided into different dialogues for each distant node. Accordingly, the first node will access the database by the address of the second node and then search for the desired dialogue that is affiliated with the second node in the table. The MAP version associated with the desired dialogue is then selected for initiating the desired dialogue with the second node.

In a further aspect of the invention, the table is refreshed periodically. It may be refreshed by deleting the entire table or individual entries once a protocol version has been extant within the table for a predetermined period of time. The table is thereafter gradually rebuilt (or the entries are gradually replenished) in the due course of accessing distant nodes and negotiating to determine the latest protocol version, such as described in connection with conventional systems and methods. In this manner, if the distant node has updated its protocol version, the table receives this updated protocol version information, enabling expedited internodal communications thereafter.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein:

FIG. 3 illustrates a Mobile Application Part (MAP) version prediction table utilized in the system and method of the present invention;

DETAILED DESCRIPTION OF THE DRAWINGS

In the following description, for purposes of explanation and not limitation, specific details are set forth, such as particular circuits, software modules, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and software code are omitted so as not to obscure the description of the present invention with unnecessary detail.

A preferred embodiment of the present invention and its advantages are best understood by referring to FIGS. 1–6B of the drawings, like numerals being used for like and corresponding parts of the various drawings.

Figure 1:
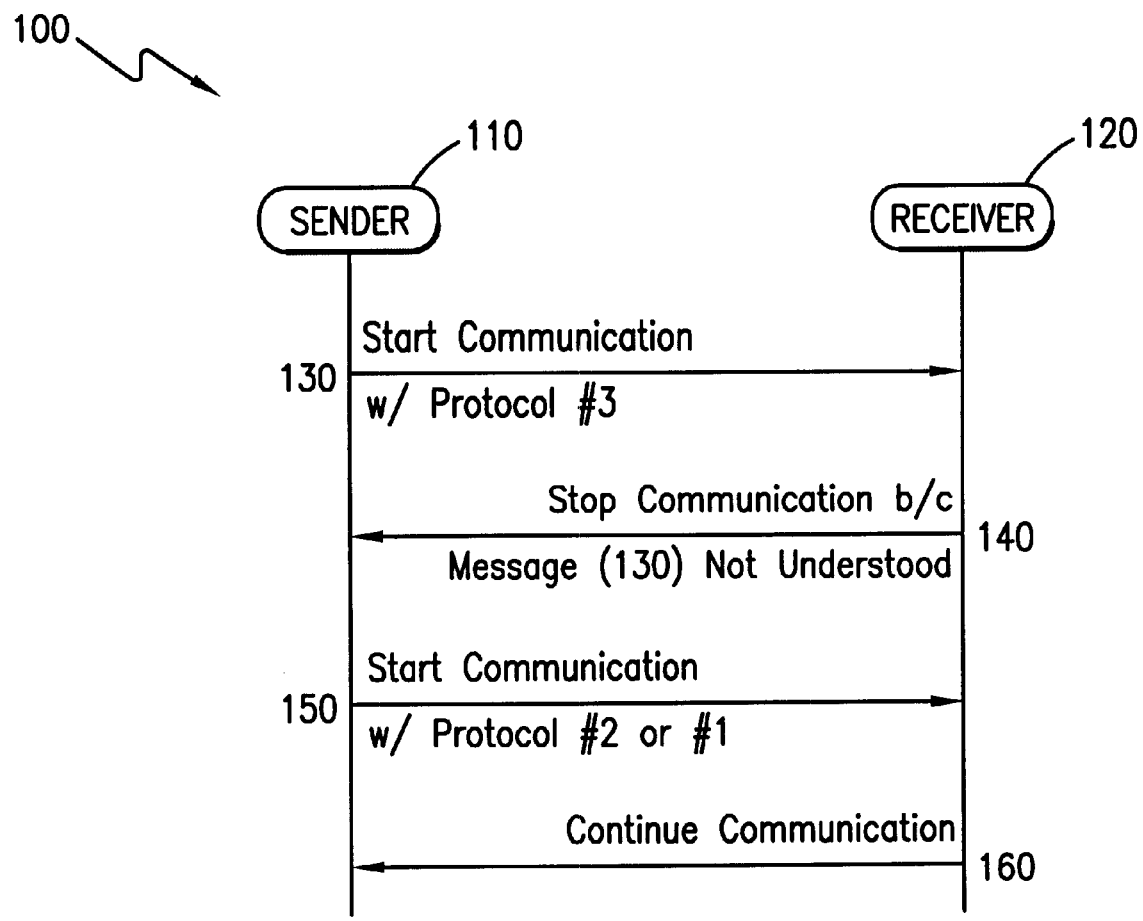
FIG. 1 illustrates a conventional fall-back procedure during a communication establishment between two nodes.
Figure 2:
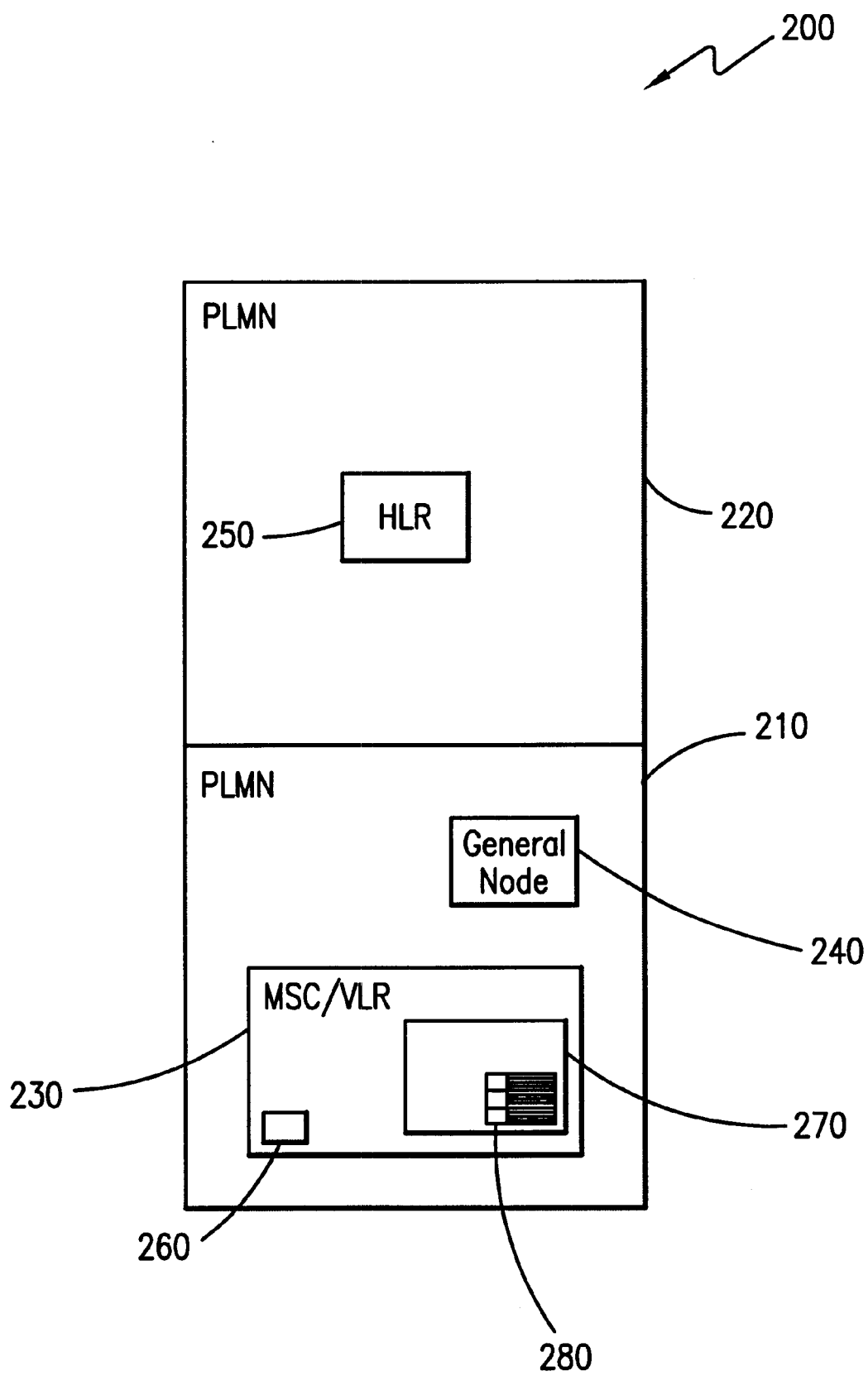
FIG. 2 illustrates general telecommunications networks that utilize the system and method of the present invention.

Referring now to FIG. 2, a communications network 200 is illustrated. The communications network 200 can be any network (wireline or wireless) in which different versions (or variations) of a given protocol are simultaneously in use; however, the communications network 200 is preferably a wireline network that is part of a mobile communications system. Also, the communications network 200 is preferably a Global System for Mobile Communications (GSM) network that utilizes, at least in part, MAP protocols.

A Public Land Mobile Network (PLMN) 210 and a PLMN 220 are illustrated as components of the communications network 200. Each of the PLMNs 210 and 220 can, in turn, be composed of any number of nodes, and each node may be operating under a different version of the MAP protocols. On the other hand, the entire PLMN may be updated to the same version of MAP. It should be noted that not every dialogue type/application context is changed in each new MAP version update. According to a preferred embodiment of the present invention, nodes may be treated individually or collectively as a group within a given PLMN, as desired.

Within the PLMN 220, for instance, an HLR 250 is illustrated. Within the PLMN 210, both an MSC/VLR 230 and a general node 240 are shown. The general node 240 represents any communications node that can be in the communications network 200. In the preferred PLMN embodiment, the general node 240 can represent an HLR, MSC, VLR, GMSC, etc. No communication lines are drawn between or among the various nodes because the MAP protocol uses connectionless signaling, which permits each transmitted message to travel a different route to its destination within the communications network 200.

Within the MSC/VLR 230, a processing unit 260 and a memory 270 are included to implement the aforementioned first embodiment of the present invention. The memory 270 is used to store a MAP Version Prediction Table 280 (as further described hereinbelow in connection with FIG. 3). Note that although the MAP Version Prediction aspect of the present invention is described hereinbelow in terms of a table for ease of understanding, the preferred computer-implemented embodiment is a database because a properly-organized database facilitates access of the data in the MAP Version Prediction Table 280.

However, any suitable method of storing the relevant information may be used to implement the present invention, as will be apparent to those skilled in the art after reading and understanding the teachings of the present invention. In accordance with the principles of the present invention, the number of messages that must be transmitted to negotiate a MAP protocol version for use in an inter-PLMN communication between the MSC/VLR 230 and the HLR 250 is reduced. The MAP Version Prediction Table 280 enables this message transmission reduction, as described in more detail hereinbelow.

The system and method of the present invention can be partially implemented in software, but it can also be implemented in hardware, firmware, etc., and combinations thereof, as is understood in the art. When the invention is implemented in software, for example, the software (and, for that matter, the database incarnation of the MAP Version Prediction Table 280) can be stored in any type of computer-accessible memory 270, e.g., volatile or nonvolatile, solid-state or not, fixed or removable media, etc. Also, the memory 270 can be, e.g., RAM, ROM, EEPROM, magnetic, optical, DVD, etc., or a yet-to-be-developed equivalent. It should be noted that the preferred self-adapting MAP-version-selection system and method of the present invention has a myriad of practical applications in the communications network arts. To wit, it lowers communication costs by reducing the number of messages transmitted in protocol negotiations.

With reference now to FIG. 3, a preferred embodiment of the MAP Version Prediction Table 280 is illustrated in more detail. A node column, designated by the reference numeral 305, includes a list of addresses of particular nodes, e.g., the HLR 250 node, in the communications network 200 of FIG. 2. The addresses of the nodes are, for example, in a format according to International Telecommunications Union (ITU) recommendation E.214, but other formats are contemplated to be within the scope of the present invention. It should be noted that a nodal entry in the node column 305 can also represent the address of either (i) an entire PLMN or (ii) a logical node or other entity within, for example, a physical node such as the aforementioned HLR 250 node.

A dialogue type column 310, shown adjacent said node column 305 in FIG. 3, includes possible dialogues, and is divided into discrete sections, e.g., the sections for node 2, collectively denoted by the reference numeral 350, that correspond to individual entries in the node column 305. Dialogues are exchanges between two nodes and equate to Application Contexts (ACs) in MAP. Examples of ACs include "Network Location Update Context" and "Roaming Number Inquiry Context". The general concept of (and the existence of specific) dialogue types/ACs are well known to those of ordinary skill in this art; hence, further details regarding particular dialogue types/ACs will be omitted.

With further reference to FIG. 3, node column 305 includes therein fields entitled "Address of Node 1" 315 to "Address of Node n" 335. It should be understood that each node that has an address in node column 305 has preferably either been contacted by or been in contact with the MSC/VLR 230 shown in FIG. 2. Affiliated with the "Address of Node 1" 315, for example, are "MAP Version used for Dialogue Type 1/2/ . . . /k", corresponding to 320/325/ . . . /330, respectively. Each dialogue type that has been initiated by the MSC/VLR 230 with "Node 1" or that has been initiated by "Node 1" with the MSC/VLR 230 is included within the aforedescribed range "MAP Version used for Dialogue Type 1/2/ . . . /k" 320/325/ . . . /330. Associated with each listed dialogue type is the corresponding MAP version that has been negotiated between the MSC/VLR 230 and "Node 1". It is to be understood that a given node may understand an advanced version with respect to one dialogue but only a simpler version with respect to another dialogue. As with Node 1, the "MAP Version used for Dialogue Type 1/ . . . /k" 340/ . . . /345, respectively, are affiliated with the "Address of Node n" 335. It should be noted that the MAP Version Prediction Table 280 can be configured otherwise by one of ordinary skill in the art.

With presently existing MAP usage, there exists application contexts with versions one through three (V.1, V.2, and V.3), and each are simultaneously in use. The particular version (or possibly variation) of MAP that was most recently negotiated between the MSC/VLR 230 and "Node 1" for a dialogue of type 1 is entered into the database that is a preferred computer-implemented embodiment of the MAP Version Prediction Table 280 at the entry 320. After accessing the MAP Version Prediction Table 280, a sender node, e.g., the MSC/VLR 230, can proceed immediately to the most feature-laden MAP version that a receiver node, e.g., Node 1 such as the HLR 250, can understand for a given dialogue type. The conventional need for one, e.g., with MAP, or more fall-backs and the requisite bandwidth usage is thereby obviated with a single elegant table without any individual operator interaction or inter-operator cooperation.

Figure 4:
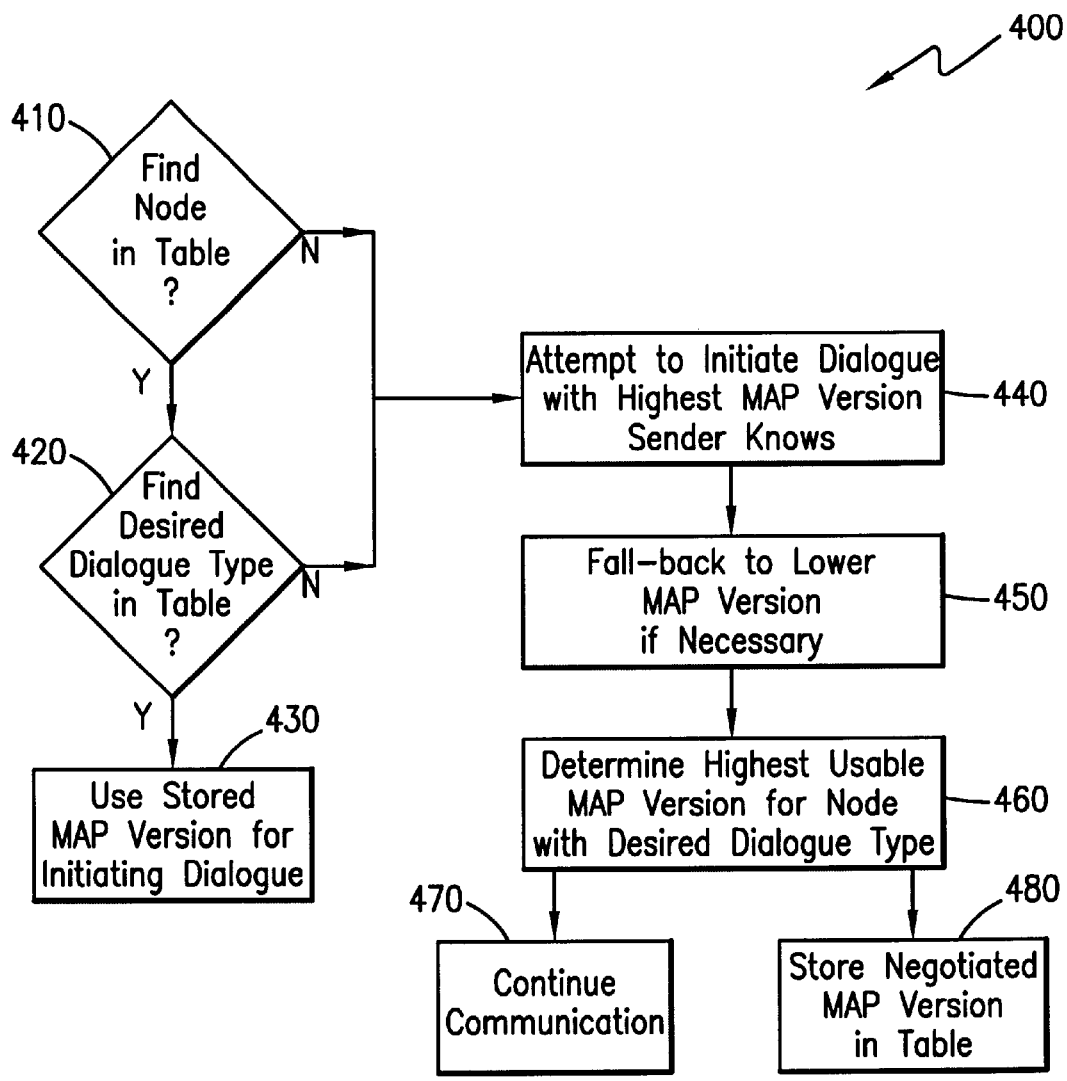
FIG. 4 illustrates in flowchart form a process of using the MAP version prediction table, shown in FIG. 3, according to the present invention.

With reference now to FIG. 4, the process of using the MAP Version Prediction Table 280 is further described. A flowchart 400 represents a process one node preferably undergoes when establishing a dialogue with another node. The process of flowchart 400 is additionally described with reference to FIGS. 2 and 3. In this example, the MSC/VLR 230 (the one or sending node) attempts to establish a dialogue with the HLR 250 (the other or receiving node). According to the present invention, the MSC/VLR 230 first searches node column 305 in the MAP Version Prediction Table 280 for the particular address of the HLR 250 (Step 410). If the address is found (at "Address of Node 1" 315 for example), the MSC/VLR 230 searches the affiliated dialogue type entries 320/325/ . . . /330 corresponding thereto. Control therefore transfers to Step 420 in which the MSC/VLR 230 searches for the desired dialogue type ("MAP Version used for Dialogue Type 2" 325 for example). If the desired dialogue type is found by the MSC/VLR 230 in the dialogue type column 310, the associated stored MAP version (V.2 for example) is determined. The MSC/VLR 230 then uses the MAP V.2 for initiating the dialogue of type 2 with the HLR 250 (Step 430). Using V.2 in this manner avoids at least one fall-back procedure and saves the corresponding cost of transmitting and retransmitting extraneous messages (assuming MSC/VLR 230 is capable of using V.3).

If, on the other hand, either the address of the HLR 250 or the desired dialogue type was not found within the MAP Version Prediction Table 280 in Steps 410 and 420, respectively, the process moves to Step 440. In Step 440, the MSC/VLR 230 attempts to initiate the desired dialogue at the highest MAP version known by the MSC/VLR 230 for the desired dialogue. One or more fall-back procedures may be required, which will lower the MAP version as necessary (Step 450). The highest usable MAP version (V.2) for the HLR 250 node with the desired dialogue type 2 is then determined (Step 460).

Steps 470 and 480 are shown in parallel to highlight that the order of their execution is not critical to the present invention. In fact, each of Steps 470 and 480 may be performed approximately simultaneously by processes running in a multitasking system in the MSC/VLR 230. Step 480, however, preferably is executed prior to Step 470 to ensure that the negotiated version is stored as soon as possible. This advantageously enables other mobile terminals/subscribers with the same dialogue type to benefit from the version information at the earliest possible time. In Step 470, the MSC/VLR 230 continues with the desired dialogue communication with the HLR 250 using the determined MAP version (V.2).

Meanwhile, the MSC/VLR 230 stores (or preferably has stored) in Step 480 the highest MAP version (V.2) that was successfully negotiated with the HLR 250 while establishing the desired dialogue type 2. In this example, "V.2" is stored in association with the "MAP Version used for Dialogue Type 2" 325 in the MAP Version Prediction Table 280. If necessary, the MSC/VLR 230 establishes an affiliated "Address of Node 1" 315 entry in the node column 305. The next time the MSC/VLR 230 needs to communicate with that HLR 250 using a dialogue of type 2, the latest MAP version will be ascertained and used by progressing through the aforedescribed Steps 410–430 without wasting valuable system resources on unnecessary fall-backs, such as those performed in conventional systems and methods.

Once a MAP version entry is stored in the MAP Version Prediction Table 280, the MSC/VLR 230 will continue to use the stored MAP version. Eventually, a receiver node (the HLR 250 in this continuing example) will be updated in some manner to a later version. In order to obviate the need for inter-operator cooperation and updating, the MAP Version Prediction Table 280 must be refreshed, preferably automatically. Periodic refreshing also enables the MAP version selection system and method to be permanent (function even before and after scheduled update occasions) and completely autonomous.

Figure 5A:
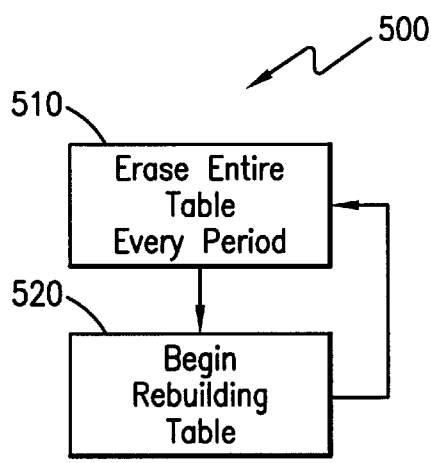
FIG. 5A illustrates in flowchart form a first embodiment of a MAP version prediction table refreshing process according to the present invention.

With reference now to FIG. 5A, flowchart 500 illustrates a first embodiment of a MAP Version Prediction Table 280 refreshing process utilized by the system and method of the present invention. In this first refreshing embodiment, the entire table is preferably erased and then gradually rebuilt. At Step 510, the MSC/VLR 230 erases every entry in the MAP Version Prediction Table 280 (of FIG. 3) after a certain time period. The time period is preferably one day, but it may be six hours, a week, a month, etc. After deleting the entirety of the MAP Version Prediction Table 280, the MSC/VLR 230 must then renegotiate the highest MAP version supported by all receiver nodes, such as the HLR 250, during Steps 440–480 (of FIG. 4). Thus, if the MAP version has been updated in the interim, the MAP Version Prediction Table 280 will receive the updated version during the rebuilding of the table at Step 520.

To clarify, the MAP Version Prediction Table 280 is not necessarily rebuilt identical to its state prior to the entire erasure at Step 510. In a preferred embodiment, the table is only rebuilt to the extent that receiver nodes need to be communicated with between a first erasure at Step 510 and a subsequent erasure at Step 510 one time period later. In other words, a node is preferably only added to the table during the rebuilding Step 520 if and when the node enters communication with the MSC/VLR 230, such as when the node needs to be contacted to service a visiting mobile terminal/subscriber.

Figure 5B:
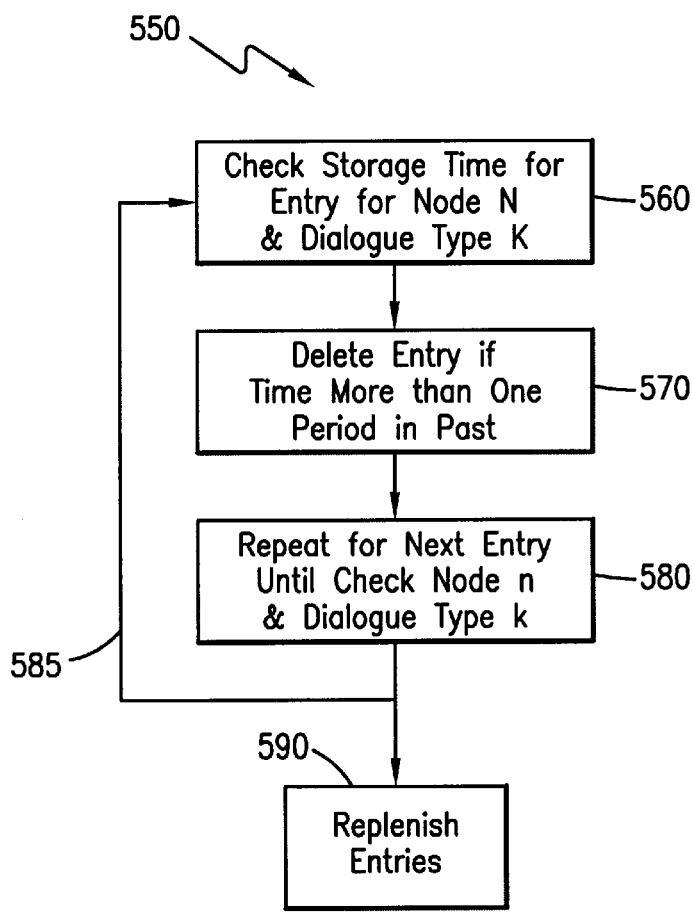
FIG. 5B illustrates in flowchart form a second embodiment of a MAP version prediction table refreshing process according to the present invention.

With reference now to FIG. 5B, flowchart 550 illustrates a second embodiment of a MAP Version Prediction Table 280 refreshing process. In this second refreshing embodiment, the table is preferably erased entry-by-entry and then gradually replenished entry-by-entry. Referring first to FIG. 3, a storage time 355, e.g., a time stamp, is appended to each entry in the dialogue type column 310. The storage time 355 represents the time at which the corresponding MAP version was stored. The storage time 355 can include a calendar date, a clock time, an internal chronograph time, etc., or any combination thereof. Also, a storage time can alternatively be included only for an entire nodal entry in the node column 305 to, for example, reduce memory requirements. The MSC/VLR 230 then preferably proceeds through the entire MAP Version Prediction Table 280 every given interval. The interval for checking the MAP Version Prediction Table 280 can be an hour, a day, etc., or a process can be constantly running with a low priority within the (potentially multitasking) processing unit 260.

Regardless of whether a set interval or a low-priority process is relied on to execute the steps in flowchart 550, the MSC/VLR 230 checks (Step 560) the storage time 355 for an entry denoted by node N and dialogue type K, where N and K represent a specific entry in the table 280. (If the storage time is only applied at the nodal level, then the database table is checked node by node instead of dialogue type by dialogue type.) According to this second refreshing embodiment, each dialogue type entry is preferably deleted or possibly marked invalid (Step 570) if the corresponding storage time 355 occurred more than a given period in the past. This aging-out period can be an hour, a day, a month, etc., as discussed.

The MSC/VLR 230 repeats the checking and potential deleting for the next entry (node N, dialogue type K+1; node N+1, dialogue type K; etc.) at Step 580. This is repeated until the MSC/VLR 230 completes the process with the last node n and dialogue type k (corresponding to entries 335 and 345 in FIG. 3). Deleted entries are then gradually replenished at Step 590 with potentially-updated protocol version levels as opportunities for negotiations arise. After Step 580, the method is repeated according to either the interval or low-priority-process alternatives (as indicated by flow arrow 585). Furthermore, under either alternative, the refresh process can be started manually, i.e., before the designated period or interval elapses. Also, such manual refreshing can apply to the whole table, a node, a dialogue type, only entries of a certain age, etc., or any combination thereof.

A sender-oriented aspect (in which the table is located at the dialogue-originating node) of the invention has been described in detail hereinabove. However, a receiver-oriented aspect (in which the table is located at the dialogue-terminating node) is equally effective at reducing the number of messages required to initiate a dialogue. For example, referring again to FIG. 2, the HLR 250 can attempt to initiate a dialogue with the MSC/VLR 230. After the negotiation between the two nodes is completed, the MSC/VLR 230, as the receiving node, still learns what the highest, mutually-understood version is for the given dialogue type/AC. The MSC/VLR 230 stores the version level in association with the initiated dialogue type/AC, which is affiliated with the address of the HLR 250 node, in the MAP Version Prediction Table 280. In other words, the building/rebuilding and replenishing of the MAP Version Prediction Table 280, e.g., of Step 520 in FIG. 5A and Step 590 in FIG. 5B, respectively, can rely on dialogues in which the MSC/VLR 230 is the receiver as well as the sender.

Figure 6A:
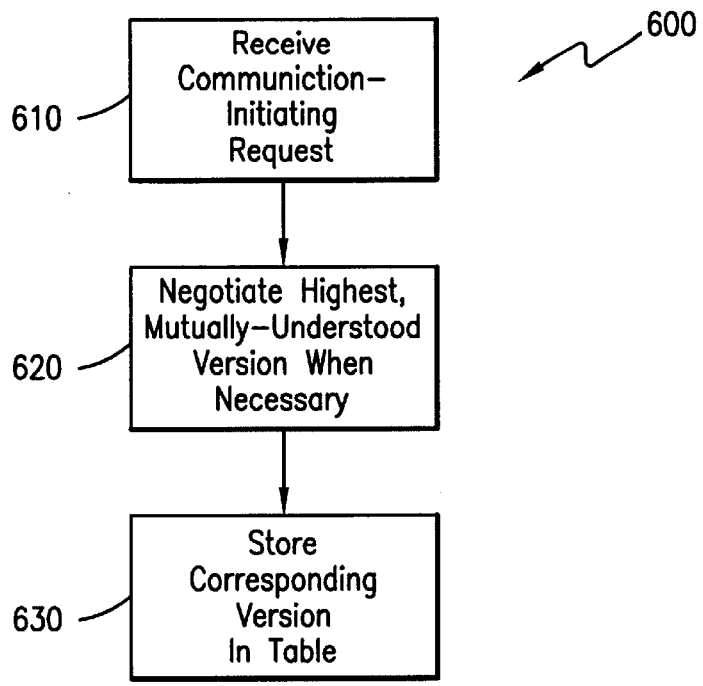
FIG. 6A illustrates in flowchart form a second process of using the MAP version prediction table, shown in FIG. 3, according to the present invention.

Referring now to FIG. 6A, a flowchart 600 represents a process in which the storing node is the receiver in a communication. If, as a first receiver-oriented example, the HLR 250 only understands V.2 while the MSC/VLR 230 understands up to V.3 for a given dialogue type, then the HLR 250 begins the negotiation with an AC of V.2. The MSC/VLR 230 receives the communication-initiating request in V.2 (Step 610) and then transmits a message to the HLR 250 to continue the dialogue.

In this first receiver-oriented example, further AC negotiation is therefore unnecessary (Step 620), but see hereinbelow for a second receiver-oriented example in which a version negotiation is necessary. Preferably prior to the transmission of the continuation message (160 in FIG. 1), the MSC/VLR 230 stores in the MAP Version Prediction Table 280 "V.2" in association with the given dialogue type (Step 630). This storing can also occur subsequent to or simultaneously with the transmission of the continuation message. As a result, when the MSC/VLR 230 subsequently needs to initiate the same dialogue type with the HLR 250, the MSC/VLR 230 can immediately begin the dialogue with V.2, thereby avoiding a fall-back procedure from V.3.

It should be noted that the processes represented by FIGS. 4, 5A, 5B, and 6A can be modified or supplanted by other methods without departing from the spirit and scope of the invention as defined by the claims. In fact, modifications and/or other methods will be apparent to those skilled in the art after studying and understanding the teachings of the current invention. Additionally, the processes are not limited to cellular networks that use the MAP protocol, but apply equally to networks in general in which different nodes have communication protocol versions updated at different times from one another.

Figure 6B:
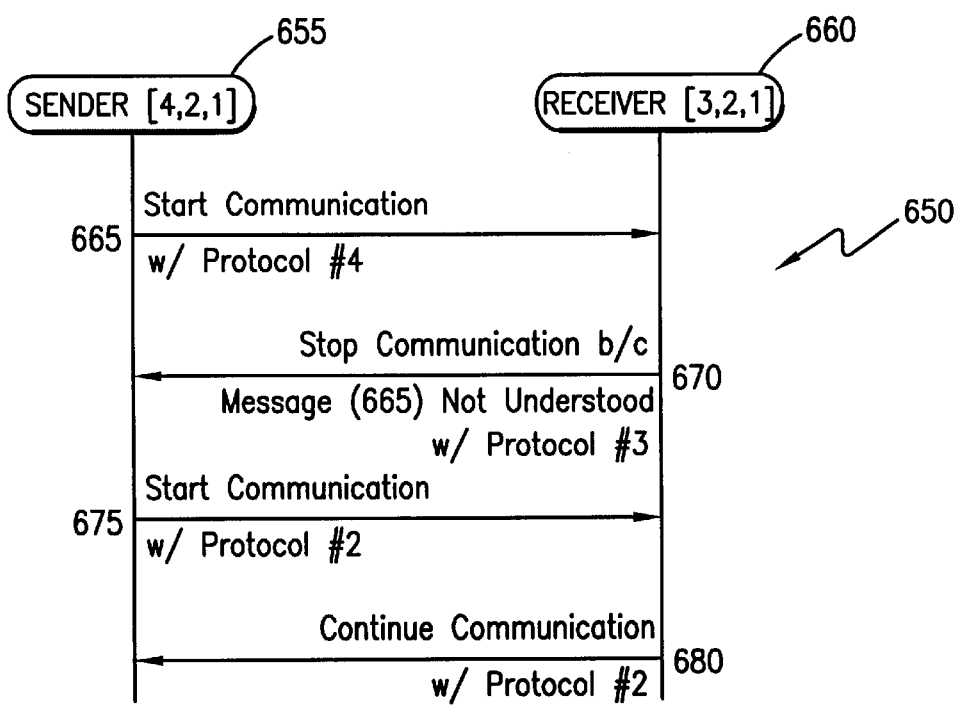
FIG. 6B illustrates a sequence diagram for a scenario in which the present invention can be advantageously employed.

Referring now to FIG. 6B, a sequence diagram 650 is illustrated. Although the scenario in sequence diagram 650 cannot occur in a GSM network utilizing MAP under the current standards, it can occur in other networks utilizing the principles of the present invention and other protocols. The present invention is beneficial in this scenario in which a sender 655 understands protocol versions four, two, and one, as shown in the figure, and a receiver 660 understands protocol versions three, two, and one. As shown in FIG. 6B, the dialogue-originating node, the sender 655, attempts to start the communication with a message 665 using protocol version four (Protocol #4).

The dialogue-terminating node, the receiver 660, responds with a message 670 in protocol version three (Protocol #3) explaining that the prior message was not understood. The sender 655 fails to understand the message 670, so the sender 655 reattempts by falling-back one version to protocol version two (Protocol #2) and transmitting a message 675. The receiver 660 understands the message 675 and instructs the sender 655 in protocol version two to continue the communication in a message 680. In this example, each node then stores protocol version two in a table that corresponds to the relevant dialogue and the opposite node.

As a second receiver-oriented example, the generic protocol version aspects from FIG. 6B are combined with the method steps of FIG. 6A. Specifically, the receiver 660 receives a communication-initiating request, e.g., the message 665 in protocol version four, from the sender 655 (Step 610). The receiver 660 and the sender 655 then need to negotiate the highest, mutually-understood version, e.g., protocol version two is negotiated through the messages 670 and 675, (Step 620). The receiver 660 can then store the corresponding version (which is the protocol version two) in a table either before, during, or after the transmission of the message 680 (Step 630).

The inventive system and method has thus far been primarily explained in terms of providing the highest (or most-advanced) protocol version that is mutually understood between two nodes. The invention, however, is not so limited. A general derivative of the MAP Version Prediction Table 280 can likewise be used to store and recall (i) merely a common or (ii) even a preferred protocol version, whether it is mutually preferred, preferred by the remote node only, etc. Furthermore, the system and method of the present invention can be used to store and recall protocols, i.e., a protocol type as compared to a protocol version level. Therefore, the invention can additionally be used at an initiating node that understands a first set of protocols to determine a preferred protocol from among the first set of protocols that corresponds to at least one protocol from among a second set of protocols understood by a terminating node. In other words, if both nodes have a preferred listing of protocols, the invention maximizes the likelihood that a common preferred protocol can and will be used.

Although a preferred and other embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a telecommunications network, a method for reducing the number of fall-back procedures in a communication between a first and a second node, said method comprising the steps of:

searching a dialogue table, connected to said first node, for a node identifier associated with said second node, said dialogue table comprising a plurality of node identifiers and a respective plurality of node dialogues for each said node identifier;

searching, within said dialogue table, said plurality of node dialogues of said second node for a particular node dialogue, said particular node dialogue corresponding to the node dialogue used by said first node in said communication;

determining a first inter-nodal protocol between said first and second nodes pursuant to said particular node dialogue; and upon said determination of the inter-nodal protocol, initiating said communication in accordance with said first inter-nodal protocol.

2. The method according to claim 1, wherein each said node dialogue is one of a plurality of node protocol versions.

3. The method according to claim 1, wherein at least one of said node dialogues is a Mobile Application Part protocol.

4. The method according to claim 1, further comprising the steps of:

upon failing to initiate said communication using said first inter-nodal protocol, determining a fall-back second inter-nodal protocol; and reinitiating said communication in accordance with said second inter-nodal protocol.

5. The method according to claim 4, wherein said first inter-nodal protocol is the most advanced protocol corresponding to said particular node dialogue for said first node and said second inter-nodal protocol is the second most advanced protocol for said first node.

6. The method according to claim 4, wherein said second inter-nodal protocol is a less-advanced protocol than said first inter-nodal protocol.

7. The method according to claim 4, further comprising the step of:

upon failure to initiate said communication using said first inter-nodal protocol and said reinitiation of said communication using said second inter-nodal protocol, updating said particular node dialogue within said dialogue table with said second inter-nodal protocol.

8. The method according to claim 1, further comprising the step of:

updating a plurality of said node dialogues for a plurality of said node identifiers within said dialogue table.

9. The method according to claim 8, wherein said step of updating deletes substantially all of said node dialogues for a plurality of said node identifiers within said dialogue table.

10. The method according to claim 9, wherein said step of updating deletes substantially all of said node identifiers within said dialogue table.

11. In a telecommunications network, a method for reducing the number of fall-back procedures in a communication between a first and a second node, said method comprising the steps of:

searching a dialogue table, connected to said first node, for a node identifier associated with said second node, said dialogue table comprising a plurality of node identifiers and a respective plurality of node dialogues for each said node identifier;

searching, within said dialogue table, said plurality of node dialogues of said second node for a particular node dialogue, said particular node dialogue corresponding to the node dialogue used by said first node in said communication;

determining a first inter-nodal protocol between said first and second nodes pursuant to said particular node dialogue;

upon said determination of the inter-nodal protocol, initiating said communication in accordance with said first inter-nodal protocol;

updating a plurality of said node dialogues for a plurality of said node identifiers within said dialogue table; and wherein said updates are performed at a predetermined interval.

12. The method according to claim 11, further comprising the steps of:

checking a storage time associated with said plurality of said node dialogues; and updating respective node dialogues if the storage time associated therewith is more than said predetermined interval.

13. The method according to claim 8, wherein said updates are performed autonomously.

14. The method according to claim 1, further comprising, prior to said searching said dialogue table, the steps of:

forming said dialogue table;

negotiating, for at least the node identifier associated with said second node, at least one node dialogue corresponding to the communication between said first and second nodes; and storing said at least one node dialogue for said second node within said dialogue table.

15. The method according to claim 1, wherein, in said step of determining, a plurality of fall-back communications are made prior to said communication.

16. The method according to claim 15, wherein at least one of said fall-back communications reduces a version level associated with said particular node dialogue.

17. The method according to claim 1, wherein said communication is an inter-network communication, said second node being in a different telecommunications network than said first node.

18. The method according to claim 1, further comprising the step of:

updating said particular node dialogue with said first inter-nodal protocol in a second dialogue table, connected to said second node, for a node identifier associated with said first node.

19. The method according to claim 18, wherein said step of updating is performed when said step of determining determines said first inter-nodal protocol based on the most advanced protocol corresponding to said particular node dialogue for said first node and said first inter-nodal protocol is not the most advanced protocol corresponding to said particular node dialogue for said second node.

20. A telecommunications system for reducing the number of fall-back procedures in an inter-nodal communication, said system comprising:

a first node having a memory means attached thereto, said memory means comprising a dialogue table having a plurality of remote node identifiers and a respective plurality of node dialogues for each said node identifier;

extraction means for extracting, upon initiation of said inter-nodal communication with a second node, a particular node dialogue corresponding to a particular remote node identifier, said particular node dialogue corresponding to the node dialogue used by said first node in said inter-nodal communication;

determination means for determining a first inter-nodal protocol between said first and second nodes pursuant to said particular node dialogue; and communication initiation means for initiating said inter-nodal communication in accordance with said first inter-nodal protocol.

21. The telecommunications system according to claim 20, wherein each said dialogue is one of a plurality of node protocol versions.

22. The telecommunications system according to claim 20, wherein said communication is an inter-network communication, said second node being in a different telecommunications network than said first node.

23. The telecommunications system according to claim 20, wherein at least one of said node dialogues is a Mobile Application Part protocol.

24. The telecommunications system according to claim 20, wherein said determination means further comprises:

fall-back communication means for determining, upon failure of said communication initiation means to establish said communication between said first and second node using said first inter-nodal protocol, a fall-back second inter-nodal protocol.

25. The telecommunications system according to claim 24, further comprising:

updating means for updating said dialogue table, said particular node dialogue within said dialogue table being updated with the value of the fall-back second inter-nodal protocol after said communication initiation means establishes said inter-nodal communication using said second inter-nodal protocol.

26. The telecommunications system according to claim 20, wherein said second node has a second dialogue table associated therewith.

27. The telecommunications system according to claim 20, further comprising:

updating means for updating a plurality of said node identifiers within said dialogue table.

28. The telecommunications system according to claim 27, wherein said updating means deletes substantially all of said node dialogues for a plurality of said node identifiers within said dialogue table.

29. The telecommunications system according to claim 28, wherein said updating means deletes substantially all of said node identifiers within said dialogue table.

30. A telecommunications system for reducing the number of fall-back procedures in an inter-nodal communication, said system comprising:

a first node having a memory means attached thereto, said memory means comprising a dialogue table having a plurality of remote node identifiers and a respective plurality of node dialogues for each said node identifier;

extraction means for extracting, upon initiation of said inter-nodal communication with a second node, a particular node dialogue corresponding to a particular remote node identifier, said particular node dialogue corresponding to the node dialogue used by said first node in said inter-nodal communication;

determination means for determining a first inter-nodal protocol between said first and second nodes pursuant to said particular node dialogue;

communication initiation means for initiating said inter-nodal communication in accordance with said first inter-nodal protocol;

updating means for updating a plurality of said node identifiers within said dialogue table; and wherein said updates are performed at a predetermined interval.

31. The telecommunications system according to claim 30, wherein said updating means checks a storage time associated with said plurality of said node dialogues and updates the respective node dialogues if the storage time associated therewith is more than said predetermined interval.

32. The telecommunications system according to claim 27, wherein said updates are performed autonomously.

33. The telecommunications system according to claim 20, wherein said first node is a sender in said inter-nodal communication.

34. The telecommunications system according to claim 20, wherein said first node is a receiver in said inter-nodal communication.

35. The telecommunications system according to claim 34, further comprising:

updating means for updating said dialogue table, said particular node dialogue corresponding to the remote node identifier of said second node within said dialogue table being updated with the value of said first inter-nodal protocol if said communication initiation means establishes said inter-nodal communication using said first inter-nodal protocol.

36. The telecommunications system according to claim 34, further comprising:

updating means for updating said dialogue table, said particular node dialogue corresponding to the remote node identifier of said second node within said dialogue table being updated with the value of a negotiated inter-nodal protocol if said communication initiation means fails to establish said inter-nodal communication using said first inter-nodal protocol.

* * * * *